May 17, 1960 H. S. SMITH ET AL 2,936,643
MEANS FOR AUTOMATICALLY MAINTAINING STEERING GEAR OVER-CENTER ADJUSTMENT
Filed June 26, 1957 2 Sheets-Sheet 1
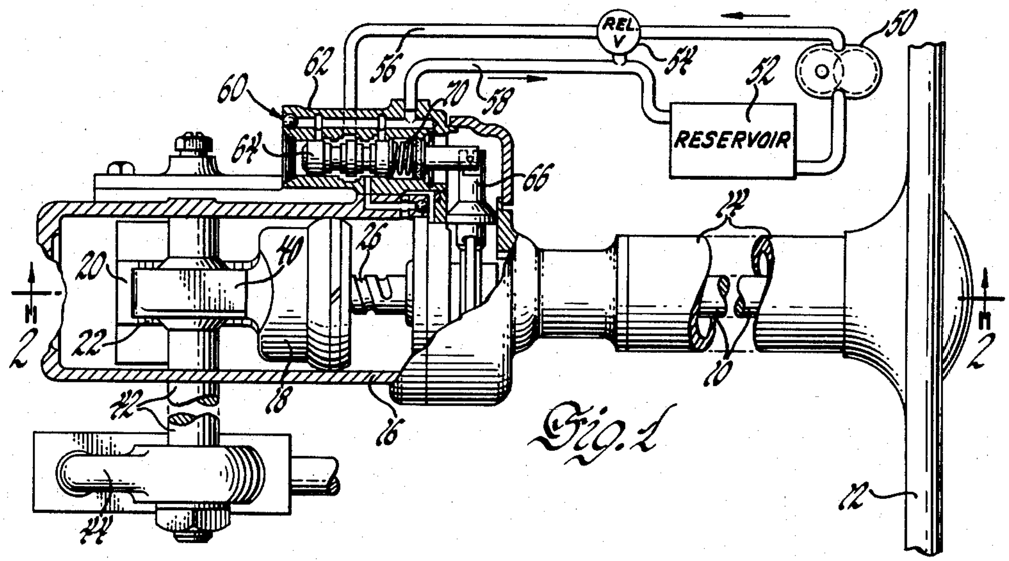
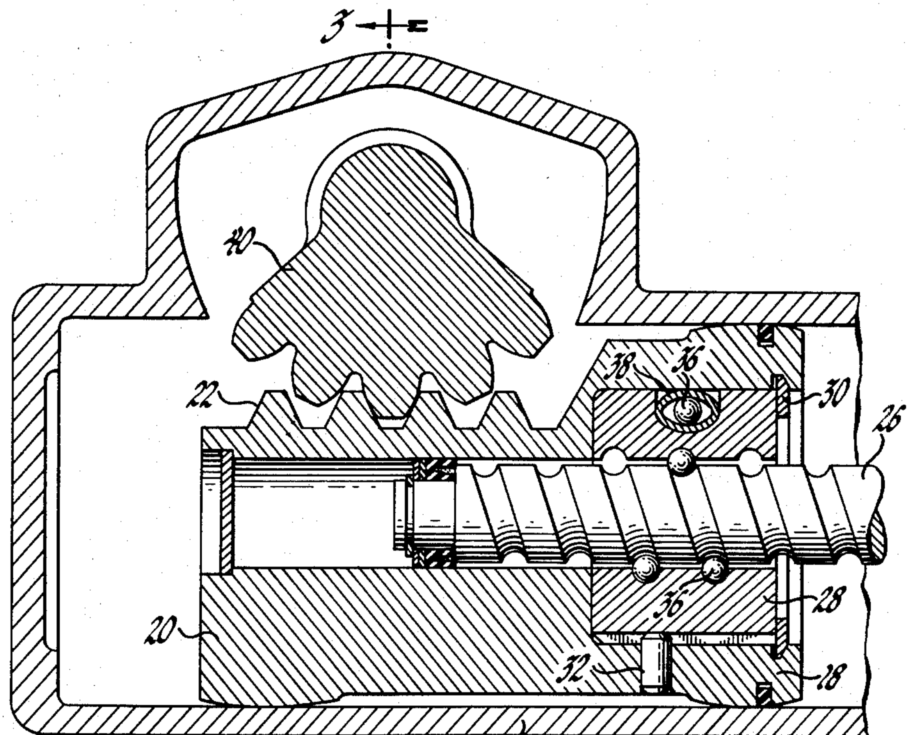
INVENTORS.
Henry S. Smith &
BY Guy W. Wesson
S. C. Thorpe
ATTORNEY.

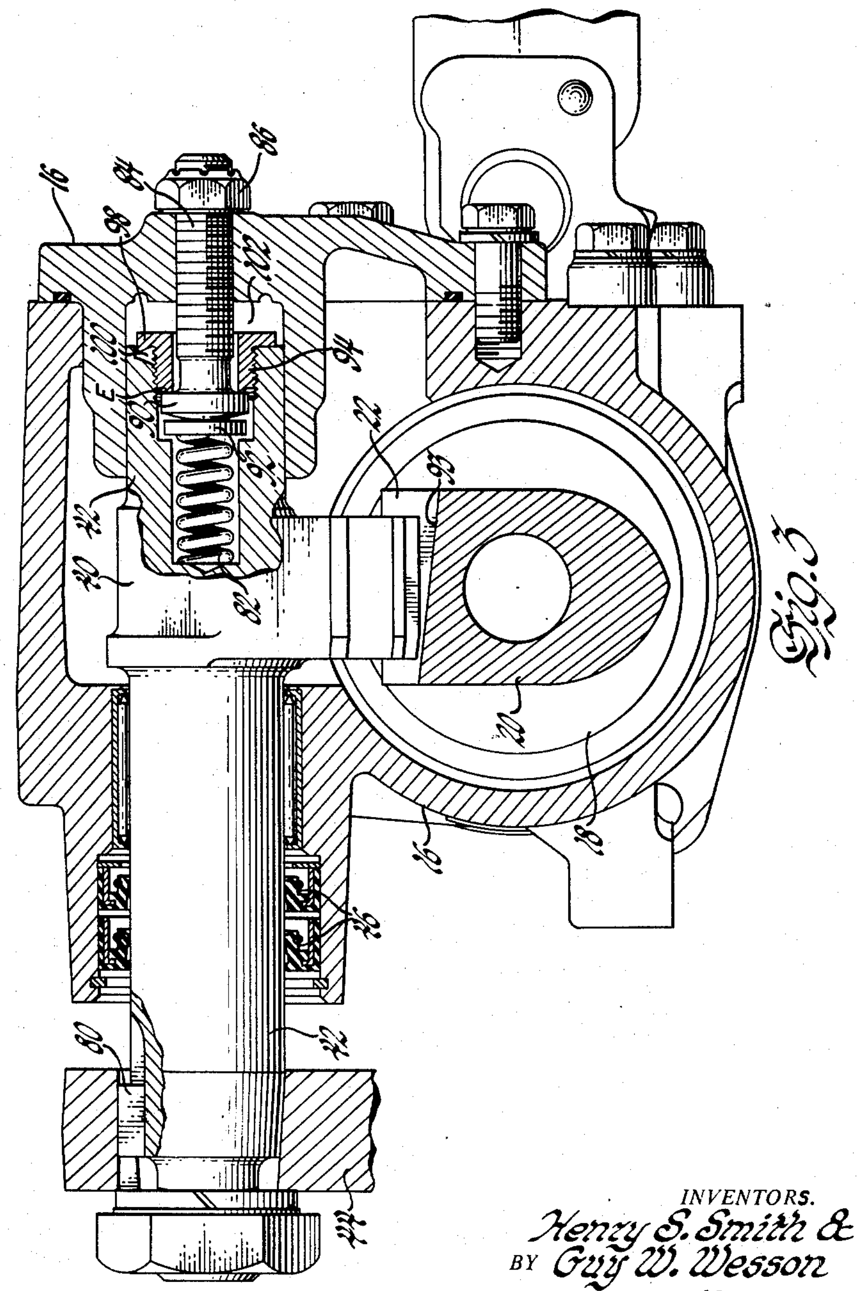
INVENTORS.
Henry S. Smith &
BY Guy W. Wesson
S. C. Thorpe
ATTORNEY.

United States Patent Office 2,936,643

Patented May 17, 1960

1

2,936,643

MEANS FOR AUTOMATICALLY MAINTAINING STEERING GEAR OVER-CENTER ADJUSTMENT

Henry S. Smith and Guy W. Wesson, Saginaw, Mich., assignors to General Motors Corporation, Detroit, Mich., a corporation of Delaware Application June 26, 1957, Serial No. 668,102

9 Claims. (Cl. 74—409)

This invention relates to steering gears for automotive vehicles and more particularly concerns means for automatically maintaining the mating gears in a condition of no-lash when the gears are in predetermined relative positions.

It is highly desirable when the dirigible steered wheels of the vehicle are in straight-ahead position that the gear teeth be in tight engagement. This makes for stability of the dirigible wheels in straight travel and for quick response thereof when the steering wheel is rotated. A condition of lash of the gears off-center, achieved as a function of the generation of the gear teeth, is also desirable in that it promotes good reversibility of the steering linkage, since the initial movement thereof is not resisted by the load of the gears and the steering shaft.

Heretofore, it has been the practice to obtain the lash adjustment over-center by the expedient of a device having the form of a bolt threaded into the gear casing and engaging the pitman arm shaft in a manner such as to force the same in a direction effecting tight engagement of the mating teeth. In this connection, see, for example, Fig. 2 of U.S. Patent 2,605,854 from which it will be noted that the bolt is secured in position by a lock nut threaded on the shank of the bolt externally of the gear casing. With this conventional arrangement, as the gear teeth wear the bolt must be periodically threaded further into the casing if the adjustment is to be maintained. As a practical matter, this is seldom done, at least not as often as desirable, with the result that the steering gear, particularly in the case of older vehicles, is frequently "sloppy" in operation.

In accordance with the invention, the desired no-lash over-center is attained and maintained through the use of yieldable means, preferably a spring, applied in a manner such that the wearing of the teeth is compensated for through expansion of the yieldable means. The apparatus comprises as an essential part an element fabricated of softer material than the teeth; such element being located and arranged to wear as the teeth wear in, but at a faster rate. It is the wearing of this element which makes possible the compensating action of the yieldable means.

The invention will be particularly described with reference to the accompanying drawings wherein Fig. 1 is a plan of a hydraulic power steering gear representative of a type of gear to which the invention is particularly applicable, certain parts being shown broken away;

Fig. 2 is a section taken on the line 2—2 in Fig. 1; and

Fig. 3 is a section on the line 3—3 in Fig. 2.

Referring first to Figure 1, the numeral 10 denotes a steering shaft carrying a steering wheel 12 at its upper end and surrounded over its length by a mast jacket 14 secured at its lower end to a gear box or power cylinder 16. This cylinder confines a piston 18 having a re-

2 duced portion 20 provided with rack teeth 22 (Figure 2).

Shaft 10 terminates within the cylinder 16 in a worm 26 accommodated in a bore in the piston 18. The piston is also counterbored to receive a ball nut 28 internally helically grooved in a manner complementary to the worm groove. The ball nut 28 is located within the piston 18 by a snap ring 30 and is prevented from rotating by a pin 32. Balls 36 serve as the connection between the worm and nut and, on rotation of the worm, travel in an endless course including the return tube 38.

It should be clear that rotation of the worm tends to bring about axial movement of the piston 18 in one direction or the other as determined by the direction of rotation of the worm.

A gear sector 40 with which the rack portion of the piston mates is integral with a cross-shaft 42 carrying a pitman 44 at its end exterior of the cylinder 16. Oil seals 46 (Figure 3) through which shaft 42 extends serve an obvious purpose.

To provide power assist to the manual effort imposed at the wheel 12, the apparatus (Figure 1) includes a pump 50, which may be driven from the engine of the vehicle as by a belt and pulley, and a reservoir 52 from which the pump draws. A relief valve 54 interconnecting the pump discharge line 56 and the reservoir return line 58 causes the pump to idle should an excessive pressure develop in the system.

Mounted fast to the cylinder 16 is a control valve 60 including a housing 62 and a spool 64 actuated through a lever arrangement 66 by axial movement of the steering shaft 10. The valve construction includes a spring 70 tending to maintain the spool 64 centered in the housing 62. For a full description of the valve and its method of operation, reference is made to co-pending application Serial No. 504,003, filed April 26, 1955. Suffice it to say here, that on a right turn, for example, the shaft 10, assuming a load in excess of the resistance of the spring 70, reacts axially downwardly (moves axially to the left in Figure 1) to displace the spool 64 to the right. Thus, pressure fluid is admitted to the chamber below the piston in the cylinder 16, while fluid is exhausted from the chamber above the piston. The pressure built up in the lower camber tends, of course, to force the piston upwardly.

Referring now to Figure 3, it will be seen that the cross-shaft 42 at its end opposite the key 80, adapted to be accommodated in a key way formed in the eye portion of the pitman bar, is bored and counterbored for the reception respectively of a spring 82 and a portion of a bolt-like member 84. The latter is threaded into the wall of the cylinder 16 and is fixed in position by a lock nut 86.

Spring 82 will be observed as spaced from the flanged end 90 of the bolt by a washer or spring seat 92. Bearing against the shoulder formed by the flange is a retainer 94 threaded into the end of the shaft 42 and secured in place by peening the flanged portion 98 into hole or notch 100.

As shown by Figure 3, the root 93 of the rack teeth is slanted so that any force tending to move the gear sector leftwarly operates to tighten the engagement of the rack teeth and the sector teeth.

Retainer 94 being fixed to the cross shaft 42 necessarily rotates with the shaft, resulting in wear at point E where the retainer engages the undersurface of the flanged head 90 of the bolt 84. The material of which the retainer is formed is carefully selected so that the rate of wear at such point exceeds the rate of wearing of the gear teeth. Accordingly, in use of the gear, as the teeth wear in, spring 82 is enabled by expansion to maintain the original lash setting. In the absence of the differential wearing at point E, the spring manifestly could not displace the cross shaft axially leftward as necessary to compensate for the teeth wear, bolt 84 occupying a fixed position.

The preloading of the spring 82 is a function of the retainer and is carried out prior to the assembly of the gear components. On the subsequent assembly, involving the mating of the teeth of the sector and rack and the application of the lock nut 86, the spring acts as a solid link, i.e. the final assembly operation is not accompanied by further compression of the spring.

In the operation of the gear there is substantial leakage of hydraulic fluid about the shaft 42 into the chamber 102, especially when the lower end of the cylinder 16 is pressurized. The pressure so developed in such chamber, working as it does against the outer face of the retainer and the surrounding portion of the shaft 42, tends to increase the wear at point E and should be taken into account.

Although the invention has been described with reference to a hydraulic power steering gear, it will be recognized as having application also to steering gears not involving a hydraulic or other assist.

What is claimed is:

1. In an assembly including a pair of members having mating gear teeth, one of said members being displaceable relative to the other with change in the lash between said teeth, a manually manipulatable element for adjusting the position of said one member to set the lash between said teeth, said element, with the lash set, having a fixed position, precompressed yieldable means through which said element exerts its force against said one member in the direction corresponding to reduction in the lash between said teeth, and means associated with said one member serving as initially installed, and with the lash between said teeth set, to preclude displacement of such member by said precompressed yieldable means in said direction, said last means in operation of said members wearing at a rate faster than said teeth whereby said yieldable means by expansion is enabled to so displace said one member to automatically compensate for wearing of said teeth.

2. In an assembly including a pair of members having mating gear teeth, one of said members being displaceable relative to the other with change in the lash between said teeth, a housing for said members, a manually manipulated element supported by said housing for adjusting the position of said one member to set the lash between said teeth, said element, with the lash set, having a fixed position in said housing, precompressed yieldable means through which said element exerts its force against said one member in the direction corresponding to reduction in the lash between said teeth, and means carried by said one member serving as initially installed, and with the lash between said teeth set, to preclude displacement of such member by said precompressed yieldable means in said direction, said last means in operation of said members being caused to wear at a rate faster than said teeth whereby said yieldable means by expansion is enabled to so displace said one member to automatically compensate for wearing of said teeth.

3. In an assembly including a pair of members having mating gear teeth, one of said members being displaceable relative to the other with change in the lash between said teeth, a housing for said members, a manually maniputable element supported by said housing for adjusting the position of said one member to set the lash between said teeth, said element, with the lash set, having a fixed position in said housing, precompressed yieldable means through which said element exerts its force against said one member in the direction corresponding to reduction in the lash between said teeth, and means carried by said one member serving as initially installed, and with the lash between said teeth set, to preclude displacement of such member by said precompressed yieldable means in said direction, said last means having a surface in contact with said element and being formed of a material softer than said teeth to the end that it is caused to wear at a rate faster than said teeth whereby said yieldable means by expansion is enabled to displace said one member in the said lash-reducing direction to automatically compensate for wearing of said teeth.

4. In a steering gear or the like, a housing, a rotatable member journaled in said housing and carrying a gear sector, a member within said housing having rack teeth in mesh with the teeth of said sector, said rotatable member being displaceable relative to said racked member with change in the lash between said teeth, a manually manipulatable element supported by said housing for adjusting the position of said rotatable member to set the lash between said teeth, said element, with the lash set, having a fixed position in said housing, precompressed yieldable means through which said element exerts its force against said rotatable member in the direction corresponding to reduction in the lash between said teeth, and means carried by said rotatable member serving as initially installed, and with the lash between said teeth set, to preclude displacement of such member by said precompressed yieldable means in said direction, said last means having a surface in contact with said element and being formed of a material such that in operation of said members it wears at a rate faster than said teeth whereby said yieldable means by expansion is enabled to displace said rotatable member in the said lash-reducing direction to automatically compensate for wearing of said teeth.

5. In a steering gear or the like, a housing, a rotatable shaft journaled in said housing and carrying a gear sector, a manually actuable member within said housing having rack teeth in mesh with the teeth of said sector, said shaft being displaceable relative to said manually actuable member with change in the lash between said teeth, a bolt threaded into said housing for adjusting the position of said shaft to set the lash between said teeth, means for securing said bolt to said housing following setting of the lash between said teeth, precompressed yieldable means through which said bolt exerts its force against said shaft in the direction corresponding to reduction in the lash between said teeth, and means carried by said shaft serving as initially installed, and with the lash between said teeth set, to preclude displacement of said shaft by said precompressed yieldable means in said direction, said last means having a surface in contact with said bolt and being formed of a material such that in operation of the gear it wears at a rate faster than said teeth whereby said yieldable means by expansion is enabled to displace said shaft in the said lash-reducing direction to automatically compensate for wearing of said teeth.

6. In a steering gear or the like, a housing, a rotatable shaft journaled in said housing and carrying a gear sector, a screw-actuated piston within said housing having rack teeth in mesh with the teeth of said sector, said shaft being axially displaceable with change in the lash between said teeth, a bolt threaded into said housing for adjusting the axial position of said shaft to set the lash between said teeth, said bolt having a flanged head and, with the lash set, having a fixed position in said housing, precompressed yieldable means through which said bolt exerts its force against said shaft in the direction corresponding to reduction in the lash between said teeth, and plug-like member carried by said shaft serving as initially installed, and with the lash between said teeth set, to preclude displacement of said shaft by said precompressed yieldable means in said direction, said plug-like member having a surface in contact with said flanged head of said bolt and being formed of a material such that in operation of the gear it wears at a rate faster than said teeth whereby said yieldable means by expansion is enabled to axially displace said shaft in the said lash-reducing direction to automatically compensate for wearing of said teeth.

7. A steering gear or the like conforming to claim 6 where said shaft is bored and counterbored at one end to accommodate said yieldable means and the flanged head of said bolt and where said plug-like member is threaded into the bored end of said shaft so as to engage the undersurface of said bolt head.

8. In a steering gear or the like, a housing, a rotatable shaft journaled in said housing and carrying a gear sector, a screw-actuated piston within said housing having rack teeth in mesh with the teeth of said sector, said shaft being axially displaceable, the root of at least one set of said teeth being canted to the end that axial displacement of said shaft is accompanied by the development of increasing or decreasing lash between said teeth depending upon the direction of the displacement, a bolt threaded into said housing for adjusting the axial position of said shaft to set the lash between said teeth, said bolt having a flanged head and, with the lash set, having a fixed position in said housing, precompressed yieldable means through which said bolt exerts its force against said shaft in the direction corresponding to reduction in the lash between said teeth, and a plug-like member carried by said shaft serving as initially installed, and with the lash between said teeth set, to preclude displacement of said shaft by said precompressed yieldable means in said direction, said plug-like member having a surface in contact with said flanged head of said bolt and being formed of a material such that in operation of the gear it wears at a rate faster than said teeth whereby said yieldable means by expansion is enabled to axially displace said shaft in the said lash-reducing direction to automatically compensate for wearing of said teeth.

9. A gear conforming to claim 8 where said shaft is bored and counterbored at one end to accommodate said yieldable means and the flanged head of said bolt and where said plug-like member is threaded into the bored end of said shaft so as to engage the undersurface of said bolt head.

References Cited in the file of this patent

UNITED STATES PATENTS

| | | |
|---|---|---|
| 2,267,524 | Hawkins | Dec. 23, 1941 |
| 2,605,854 | MacDuff | Aug. 5, 1952 |
| 2,688,260 | Muller | Sept. 7, 1954 |
| 2,765,668 | Milne | Oct. 9, 1956 |

FOREIGN PATENTS

| | | |
|---|---|---|
| 760,195 | Great Britain | Sept. 1955 |